US009926691B2

(12) United States Patent
Di Monte, Sr.

(10) Patent No.: US 9,926,691 B2
(45) Date of Patent: Mar. 27, 2018

(54) AIR ADMITTANCE AND CHECK VALVE (71) Applicant: AA Anti-Air-Lock Corp, Iselin, NJ (US)

(72) Inventor: Michael Anthony Di Monte, Sr., Cream Ridge, NJ (US)

(73) Assignee: Michael A. DiMonte, Cream Ridge, NJ (US)

( * ) Notice: Subject to any disclaimer, the term of this patent is extended or adjusted under 35 U.S.C. 154(b) by 0 days.

(21) Appl. No.: 15/246,464

(22) Filed: Aug. 24, 2016

(65) Prior Publication Data
US 2017/0298602 A1 Oct. 19, 2017

Related U.S. Application Data (63) Continuation-in-part of application No. 15/132,131, filed on Apr. 18, 2016, now Pat. No. 9,797,120.

(51) Int. Cl.
E03C 1/122 (2006.01)
F16K 15/04 (2006.01)
F16K 27/02 (2006.01)

(52) U.S. Cl.
CPC .......... *E03C 1/1225* (2013.01); *F16K 15/048* (2013.01); *F16K 27/0209* (2013.01)

(58) Field of Classification Search
CPC ... E03C 1/1225; F16K 15/048; F16K 27/0209
USPC ....................... 137/533.11–533.21
See application file for complete search history.

(56) References Cited

U.S. PATENT DOCUMENTS

| 2,394,911 | A | * | 2/1946 | Griswold | ................ | E03C 1/108 137/217 |
| 3,036,782 | A | * | 5/1962 | Windsor | ................ | A62C 37/10 138/41 |
| 3,513,875 | A | * | 5/1970 | Nelson | ...................... | F16K 7/00 137/223 |
| 4,139,469 | A | * | 2/1979 | Rainin | ................ | B01D 15/166 137/512 |

(Continued)

FOREIGN PATENT DOCUMENTS

RU 2059138 C1 4/1996

OTHER PUBLICATIONS

Hayward® PVC Ball Check Valves With EPDM O-Rings www.hayward-valves.com/check-valves/TC-CHECK-VALVES-PVC-EPDM.html Aug. 21, 2015.

(Continued)

*Primary Examiner* — Craig Schneider
*Assistant Examiner* — P. Macade Nichols (57) ABSTRACT An apparatus to allow or stop a flow into a piping system or an enclosed environment comprises a housing having an upper flow passage, a gasket, and a lower flow passage, wherein said gasket is between said upper flow passage and said lower flow passage, wherein said gasket has an inner diameter less than an inner diameter of said upper flow passage; a rotary valve inside said housing, wherein said rotary valve further comprises a main body and two guides affixed to said main body in opposition to each other, wherein said main body of said rotary valve is configured to be between said inner diameter of said gasket and said inner diameter of said upper flow passage, and wherein said rotary valve can move inside said upper flow passage and above said gasket; and two guide rails inside the upper flow passage.

18 Claims, 8 Drawing Sheets (56) References Cited

U.S. PATENT DOCUMENTS

| | | | | |
|---|---|---|---|---|
| 5,474,541 A | * | 12/1995 | Ritsky | ............... B65D 47/06 |
| | | | | 137/533.11 |
| 6,234,198 B1 | | 5/2001 | Chalich | |
| 7,140,388 B2 | | 11/2006 | Chalich | |
| 8,403,241 B2 | * | 3/2013 | Jung | ............... B05B 7/2462 |
| | | | | 137/533.11 |
| 2003/0062086 A1 | | 4/2003 | Chalich | |

OTHER PUBLICATIONS

Hayward® Product Manual, TC Series True Union Ball Check Valves, pp. 29-30, 2015.

* cited by examiner

AIR ADMITTANCE AND CHECK VALVE

CROSS-REFERENCE RELATED TO RELATED APPLICATIONS

This application is a continuation-in-part of commonly-owned, same inventor, presently co-pending U.S. Nonprovisional patent application Ser. No. 15/132,131, filed Apr. 18, 2016, which is incorporated herein by reference in its entirety. U.S. Nonprovisional patent application Ser. No. 15/132,131 also claims the priority and benefit of US provisional patent application No. U.S. Provisional Application No. 62/151,463, filed Apr. 23, 2015.

STATEMENT REGARDING FEDERALLY SPONSORED RESEARCH OR DEVELOPMENT

Not Applicable

BACKGROUND

A variety of air admittance valves have been made over the years for allowing air to enter a piping system or an enclosed environment under a negative or vacuum pressure, which is created when water is flowing down the drain for instance thus to preventing siphoning of traps or when a sump pump keeps pumping water and air out of an enclosed sump pit. Attaching an air admittance valve allows ambient air to enter the enclosed environment to eliminate negative pressure or vacuum in the enclosed system. Many of these products are specifically or only designed for systems such as piping systems and sewer systems where a local vent or air intake is not possible or due to the difficulty of running pipes through an already built home. Typically, these air admittance valves only provide specific operating conditions such as the vacuum pressure in the amount of air required. The air admittance valves available in the market today do not provide for an instantaneous and higher volume of air demand. And this causes a problem when existing air admittance components are installed on systems requiring the higher airflow demand. This problem causes strain on the air admittance component and cause it to fail prematurely in addition it causes it to operate against its own design because it was designed to work on a natural gravity air flow vacuum or negative pressure constraint. Also it is a problem that the air admittance valves not working at all or failing immediately when a high airflow demand is required. Furthermore another problem is that air admittance components available do not filter the air and therefore can allow for corrosive environment to enter the system and damaging the Air admittance components.

There is also an undesired negative situation that the piping system will generate a negative pressure in the piping system when the flow is drained from the piping system. When negative pressure occurs, the water seals in the U-band or trap will be syphoned out and losses the function to prevent sewer gas to enter the house. Therefore, various air admittance valves have designed to allow air enter a piping system to prevent the negative pressure environment. However, regular air admittance valve is also easy to fail.

For these reasons are users are disappointed when there is no product available on the market that they can use for a higher volume demand in a negative pressure scenario such as an enclosed pit with a pump requiring air to enter the system at the same rate of which it is pumping the water out. For instance a pump that can pump 20 gallons per minute and would require a large demand of airflow to enter the system so that a vacuum does not occur putting stress on the pump and causing the water discharge to not operate and discharge the water properly. In the case of a sump pump, the pump becomes air locked and runs continuous which causes the pump to overheat, burnout and/or fail causing the area to flood and cause water damage to the building.

In many cases it is also required that after air enters the system that there is a proper seal in place to provide a radon gas, water and airtight seal after the air has been allowed to enter the system and when the pump disengages. It is also required that if failure is to occur on such an air admittance component that it must fail in a closed/sealed position providing continued protection so that no air, water or radon gas can escape into the air within the building or within a certain high of the structures roof line on the exterior.

BRIEF SUMMARY OF THE INVENTION

This Brief Summary is included so as to introduce, in an abbreviated form, various topics to be elaborated upon below in the Detailed Description. This Brief Summary is not intended to identify key or essential aspects of the claimed invention. This brief Summary is similarly not intended for use as an aid in determining the scope of the claims. The subject matters of this application overcomes the aforementioned problems and may be used as an apparatus to allow or stop a flow into a piping system or an enclosed environment comprises a housing having an upper flow passage, a gasket, and a lower flow passage, wherein said gasket is between said upper flow passage and said lower flow passage, and wherein said gasket has an inner diameter smaller than an inner diameter of said upper flow passage; a rotary valve inside said housing, wherein said rotary valve further comprises a main body and two guides affixed to said main body in opposition to each other, wherein said rotary valve has a predetermined weight, wherein said main body of said rotary valve is configured to be between said inner diameter of said gasket and said inner diameter of said upper flow passage, and wherein said rotary valve can move inside said upper flow passage and above said gasket; and two guide rails inside the upper flow passage for guiding the rotary valve between an open position and a closed position, wherein said each of two guides of said rotary valve are disposed in each of said two guide rails, and wherein said two guides move freely up and down in said two guide rails.

The apparatus is an invention that allows for the required volume of air to enter a piping system or an enclosed environment when there is a sufficient pressure difference between the ambient environment and the negative pressure in the piping system or an enclosed environment generating sufficient force to lift the rotary valve, the rotary valve will open and allow air/water flow to enter the piping system or enclosed environment. Therefore, the negative pressure will be eliminated.

When the piping system has radon gas, methane or other gas that generate positive pressure in the piping system or the enclosed environment the rotary valve will stay in the closed position and prevents radon gas, methane or other gas from leaving the piping system or the enclosed environment. The invention provides the proper seal by the rotary valve which has many advantage than the traditional flap valve. The rotation of the rotary valve will allow the contact points of the valve and the gasket to constantly rotate and change, which will prolong the life of the valve. The rotation of the rotary valve will have less friction to move since rotational friction is less than static rotation. The rotation of the rotary valve will be less likely to be clogged and have less noise. The guide rail will allow the rotary valve to properly return back to the gasket even when the air admittance and check valve is not installed vertically, which is a burdensome requirement for all other types of air admittance and check valves.

BRIEF DESCRIPTION OF THE DRAWINGS

It should be understood that the drawings are merely representative, are not necessarily drawn to scale, and are not intended to limit the subject matter of this application.

DETAILED DESCRIPTION

Before the present invention is described in greater detail, it is to be understood that this invention is not limited to particular embodiments described, and as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Other than in the embodiment or example, or where indicated otherwise, all numbers indicating ingredient quantities and/or reaction conditions are to be understood as being modified in every instance by the word "about," which means the ingredient quantities or reaction conditions are within 10 percent to 15 percent of the indicated value.

Unless defined otherwise, all terms used herein have the same meaning as commonly understood by one of ordinary skill in the art to which this invention belongs. Although any methods and materials similar or equivalent to those described herein can be used in the practice or testing of the present invention, some potential and exemplary methods and materials may now be described. Any and all publications mentioned herein are incorporated herein by reference to disclose and describe the methods and/or materials in connection with which the publications are cited. It is understood that the present disclosure supersedes any disclosure of an incorporated publication to the extent there is a contradiction.

It must be noted that as used herein and in the appended claims, the singular forms "a", "an", and "the" may also include the plural referents unless the context clearly dictates otherwise.

It is further noted that the claims may be drafted to exclude any element that may be optional. As such, this statement is intended to serve as antecedent basis for use of such exclusive terminology as "solely", "only" and the like in connection with the recitation of claim elements, or the use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention.

Figure 1:
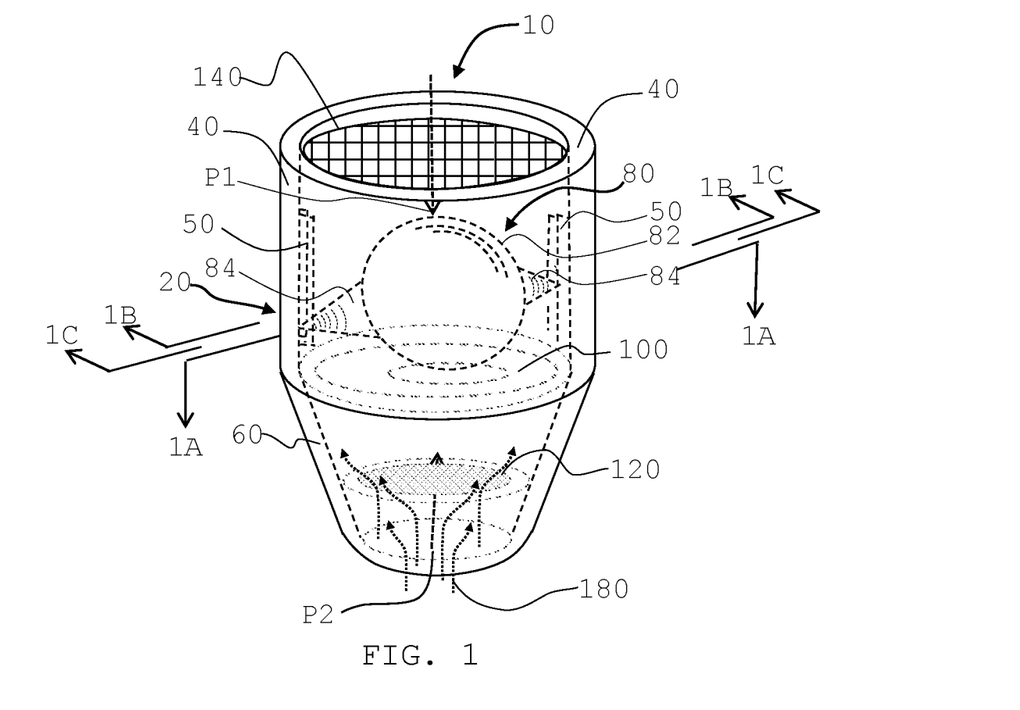
FIG. 1 is a perspective view of one of the embodiments of the invention.
Figure 1A:
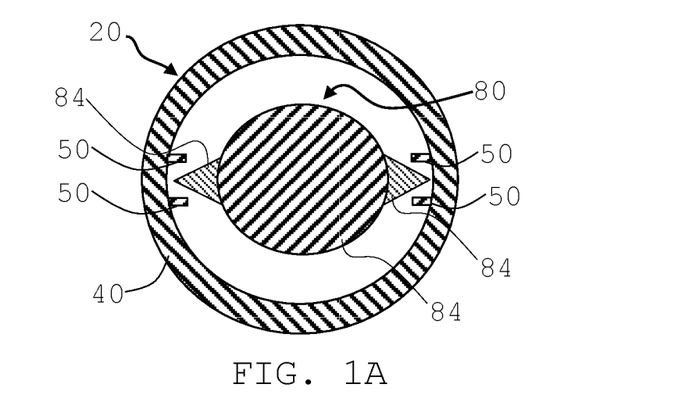
FIG. 1A is a sectional view from the top of one of the embodiments of the invention.
Figure 1B:
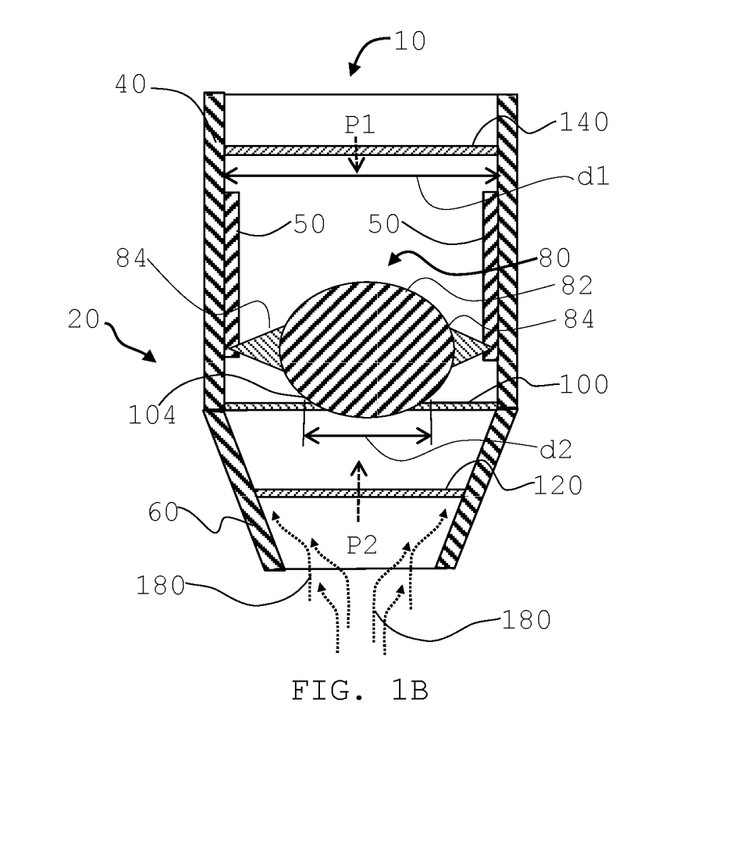
FIG. 1B is a sectional view from the side of one of the embodiments of the invention when the rotary valve is in a closed position.
Figure 1C:
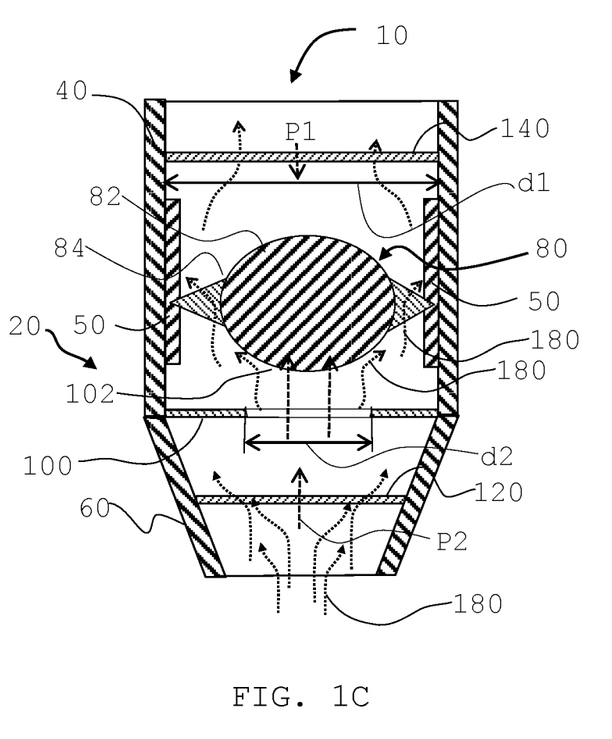
FIG. 1C is a sectional view from the side of one of the embodiments of the invention when the rotary valve is in a closed position.

Referring to FIG. 1, FIG. 1 A, FIG. 1B, and FIG. 1C, one of the preferred embodiment of an apparatus 10 to allow or stop a flow 180 into an enclosed environment 200 (FIG. 5) or a piping system 300 (FIG. 7) comprises a housing 20 having an upper flow passage 40, a gasket 100, and a lower flow passage 60, wherein said gasket 100 is between said upper flow passage 40 and said lower flow passage 60, and wherein said gasket 100 has an inner diameter d2 less than an inner diameter d1 of said upper flow passage 40; a rotary valve 80 inside said housing 20, wherein said rotary valve 80 further comprises a main body 82 and two guides 84 affixed to said main body 82 in opposition to each other, wherein said rotary valve 80 has a predetermined weight, wherein said main body 82 of said rotary valve 80 is configured to be between said inner diameter d2 of said gasket 100 and said inner diameter d1 of said upper flow passage 40, and wherein said rotary valve 80 can move inside said upper flow passage 40 and above said gasket 100; and two guide rails 50 inside the upper flow passage 40 for guiding the rotary valve 80 between said open position 102 and said closed position 104, wherein said each of two guides 84 of said rotary valve 80 are disposed in each of said two guide rails 50, and wherein said two guides 84 move freely up and down in said two guide rails 50. Said two guides 84 can be affixed with said main body 82 of said rotary valve 80 by mounting with said main body 82 or by molded as one piece with said main body 82. Said two guide rails 50 can be separately made and affixed to said upper flow passage 40 or molded together with said upper flow passage 40 as one piece.

Also referring to FIG. 1, FIG. 1 A, FIG. 1B, and FIG. 1C, in one preferred embodiment, gasket 100 is made of flexible material, such as rubber having a Shore Hardness between 60 A and about 90 A. An upper flow passage pressure P1 exists in said upper flow passage 40, wherein a lower flow passage 60 pressure P2 exists in said lower flow passage 60, wherein said rotary valve 80 is in a closed position 104 when said rotary valve 80 rests on said gasket 100 to seal said gasket 100, wherein said rotary valve 80 is in said open position 102 when said rotary valve 80 moves away said gasket 100 to unseal said gasket 100, wherein said rotary valve 80 is in said open position 102 when said lower flow passage pressure P2 is greater than a predetermined weight of said rotary valve 80 and said upper flow passage pressure P1, and wherein said rotary valve 80 is in said closed position 104 when said lower flow passage pressure P2 is less than or equal to said predetermined weight of said rotary valve 80 and said upper flow passage pressure P1, wherein said flow 180 cannot pass through said gasket 100 when said rotary valve 80 is in said closed position 104, and wherein said flow 180 can pass through said gasket 100 when rotary valve 80 is in said open position 102. Said gasket 100 is made of a flexible material, which can be substantially contacted with said main body 82 of said rotary valve 80 to seal said gasket 100 when said rotary valve 80 is in said closed position 104.

Also referring to FIG. 1, FIG. 1A, FIG. 1B, and FIG. 1C, in one embodiment, said lower flow passage filter 120 in said lower flow passage 60 and said upper flow passage filter 140 in said upper flow passage 40 prevents particles and pollutants in said flow 180 from entering said housing 20 and prevents foreign objects, such as particles and bugs, from passing through said apparatus 10, which will be detrimental to said seal 160 between said rotary valve 80 and said gasket 100. The apparatus 10 can be connected with other pipes or conduits by any types of pipe connection, such as but not limited to fastener, treaded pipe, solvent welding, soldering, brazing, welding compression fittings, or crimped. The material of the housing 20 can be such as but not limited to plastic, copper, brass, cast iron, steel, and other commonly used in the field of art of piping.

Also referring to FIG. 1, FIG. 1A, FIG. 1B, and FIG. 1C, in one embodiment of the invention, the lower flow passage filter 120 in the lower flow passage 60 and the upper flow passage filter 140 in the upper flow passage 40 is made of stainless steel or durable plastics and has filter particles equal or larger than 300 micron. However, the material of the lower flow passage filter 120 and the upper flow passage filter 140 can be other types of material that can sustain high humidity, erosive environment, such as but not limited to rubber, plastic, Teflon, and galvanized steel. Said rotary valve 80 can be lifted by a lifting force to detach said rotary valve 80 from said gasket 100 when the lifting is created by an pressure difference when the upper flow passage pressure P1 above said gasket 100 is less than lower flow passage pressure P2 in the lower flow passage 60. In one preferred embodiment of the invention, an lower flow passage pressure P2 in the lower flow passage 60 is about 8.7 pounds per square inch (60 Kilopascal) greater than the upper flow passage pressure P1 above said gasket 100, wherein said flow 180 will flow through said housing 20 and said upper flow passage 40 when said rotary valve 80 is lifted. The weight of the rotary valve 80 can be depended on the said pressure difference that the apparatus 10 is designed to control under that situation to stop or allow the air or water passage. In one preferred embodiment of the invention, the rotary valve 80 is weighed from about one ounce to about one pound and one ounce.

Figure 2:
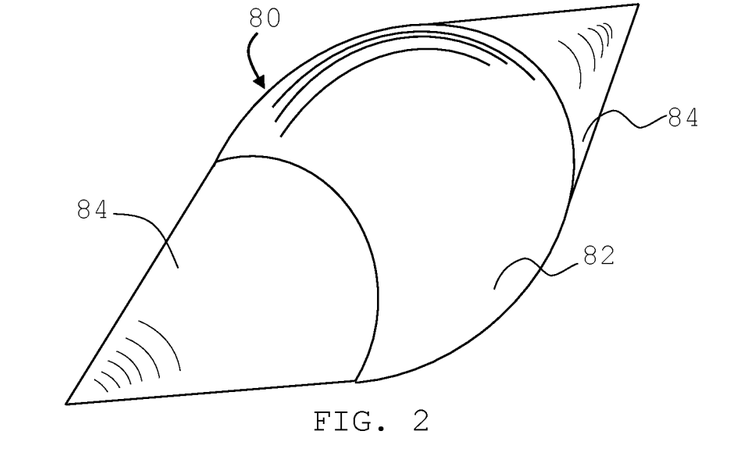
FIG. 2 is a schematic view of one of the embodiments of the rotary valve of the invention.

Referring to FIG. 2, in one embodiment of the apparatus 10, the rotary valve 80 has a main body 82 in an oval shape with two guides 84 affixed to said main body 82 in opposition to each other (guides 84). The rotary valve 80 can be rotated by flow 180, but might be in a random and bi-directional.

Figure 3:
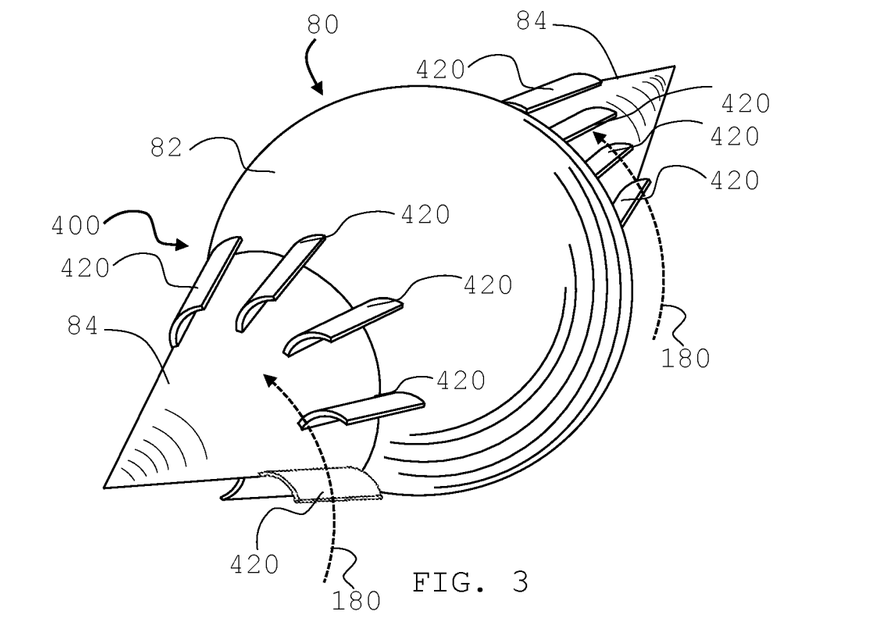
FIG. 3 is a schematic view of one of the embodiments of the rotary valve with turbulator of the invention.

Referring to FIG. 3, in one embodiment of the apparatus 10 further comprises a turbulator 400 affixed on each of said two guides 84, wherein said turbulator 400 comprises a plurality of impellers 420 radially affixed to each of said guides 84, and wherein said turbulator 400 rotates said rotary valve 80 axially relative to said two guides 84 when said flow 180 from said lower flow passage 60 pushes said plurality of impellers 420. The plurality of impellers 420 in one single direction will ensure the rotary valve 80 rotate in one direction and faster than the rotary valve 80 without turbulator 400 (FIG. 2). The uniform rotation direction of the rotary valve 80 will increase the speed of the rotary valve 80 going up to open the rotary valve 80.

Figure 4:
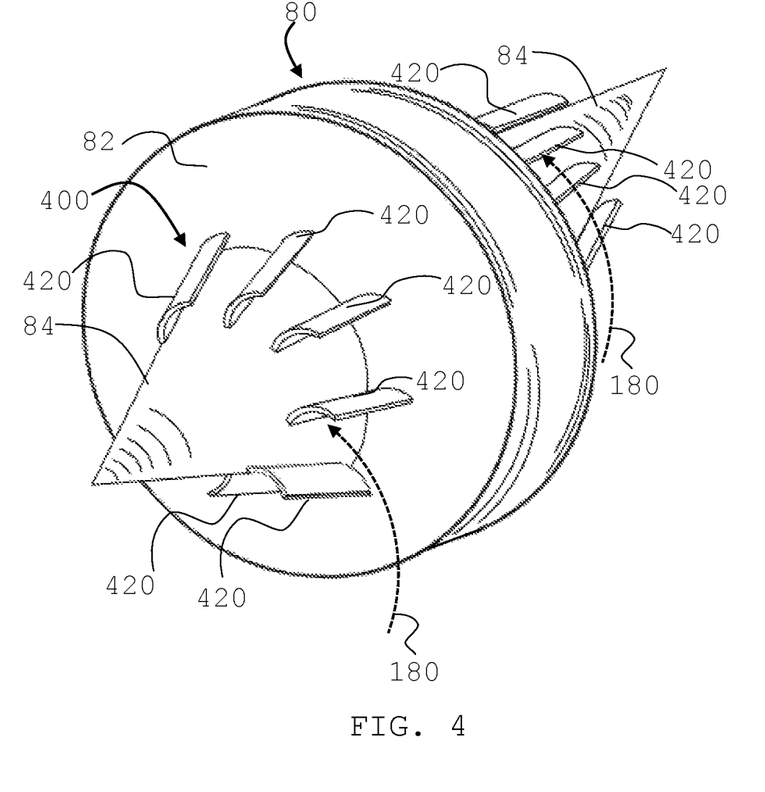
FIG. 4 is a schematic view of one of the embodiments of the rotary valve with turbulator of the invention.

Referring to FIG. 4, in one embodiment of the apparatus 10 the main body 82 has a disc shape with turbulator 400 comprising a plurality of impellers 420. The main body 82 of said rotary valve 80 can be in different rotatable shapes, such as oval, disc, round, or cylinder.

Figure 5:
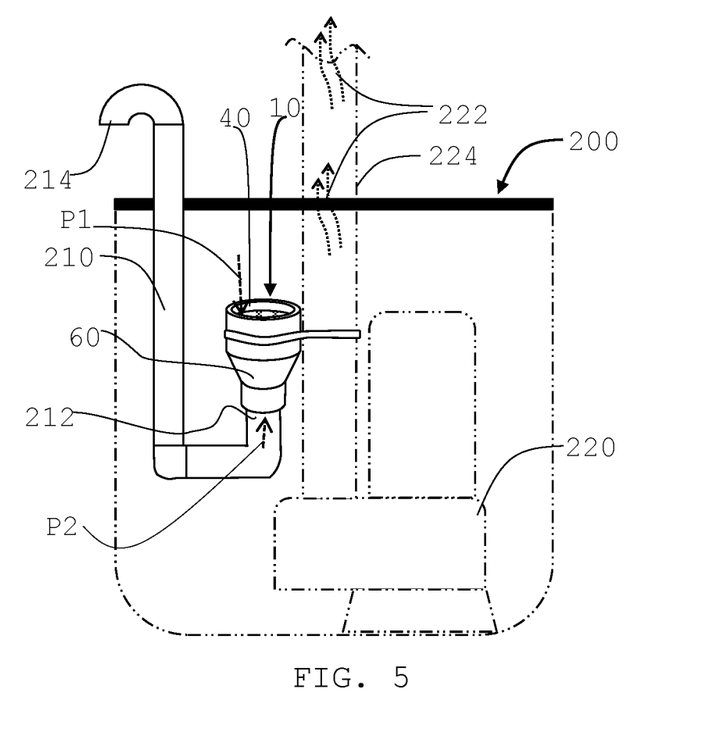
FIG. 5 is a schematic view of one of the embodiments of the invention inside an enclosed environment.

Referring to FIG. 5, in one embodiment of the apparatus 10, said apparatus 10 is inside an enclosed environment 200, wherein said enclosed environment 200 has an ambient pressure same as the upper flow passage pressure P1 in said enclosed environment 200, wherein said enclosed environment 200 further comprises at least one conduit 210, wherein each said at least one conduit 210 has a first end 212 and a second end 214, wherein each of said at least one conduit 210 has said first end 212 connected to said lower flow passage 60 of said apparatus 10 and said second end 214 extends out of said enclosed environment 200, wherein said upper flow passage 40 is opened and adopted to said ambient pressure P1 of said enclosed environment 200, wherein said enclosed environment 200 has at least one pumping device 220, which conveys water and/or air 222 in said enclosed environment 200 to outside said enclosed environment 200, and wherein said at least one pumping device 220 causes a said pressure difference to said apparatus 10 when said at least one pumping device 220 conveys water and/or air 222 through at least one pipe 224 out of said enclosed environment 200. The pumping of pumping device 220 will cause a vacuum, negative pressure situation, which causes said upper flow passage pressure P1 in the enclosed environment 200 to drop below said lower flow passage pressure P2 in said lower flow passage 60 and the weight of the rotary valve 80; therefore, a lifting force to lift the rotary valve 80 (FIG. 3) off the gasket 100 (FIG. 3) to allow flow 180 from lower flow passage 60 to upper flow passage 40 and the enclosed environment 200 to release the negative pressure condition. In one preferred embodiment, the apparatus 10 is designed to provide at least flow 180 of 12 Cubic Inch/Second per each millimeter of pipe 224 of said at least one pumping device 220.

Figure 6:
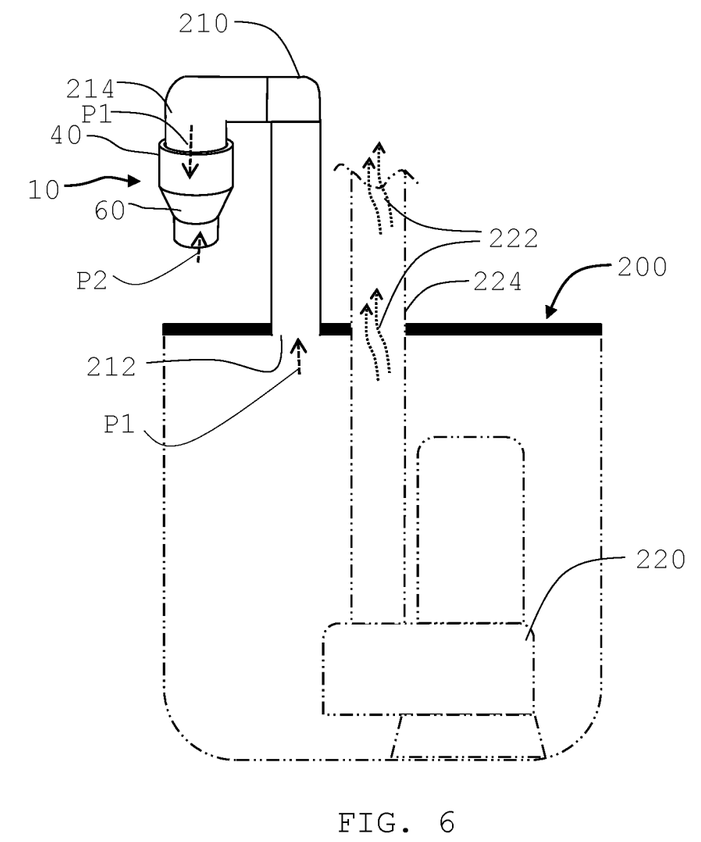
FIG. 6 is a schematic view of one of the embodiments of the invention outside an enclosed environment.

Referring to FIG. 6, in one embodiment of the apparatus 10, said apparatus 10 is outside an enclosed environment 200, wherein said enclosed environment 200 has an ambient pressure in said enclosed environment 200 same as the upper flow passage pressure p1, wherein said enclosed environment 200 further comprises at least one conduit 210, wherein each said at least one conduit 210 has a first end 212 and a second end 214, wherein each of said at least one conduit 210 has said first end 212 connected to said upper flow passage 40 of said apparatus 10 and said second end 214 extends into said enclosed environment 200, wherein said upper flow passage 40 is opened and adopted to said ambient pressure P1 of said enclosed environment 200, wherein said enclosed environment 200 has at least one pumping device 220, which conveys water and/or air 222 in said enclosed environment 200 to outside said enclosed environment 200. The pumping of pumping device 220 will cause a vacuum, negative pressure situation, which causes said upper flow passage pressure P1 in the enclosed environment 200 to drop below said lower flow passage pressure P2 in said lower flow passage 60 and the weight of the rotary valve 80; therefore, a lifting force to lift the rotary valve 80 (FIG. 3) off the gasket 100 (FIG. 3) to allow flow 180 from lower flow passage 60 to upper flow passage 40 and the enclosed environment 200 to release the negative pressure condition. In one preferred embodiment, the apparatus 10 is designed to provide at least flow 180 of 12 Cubic Inch/Second per each millimeter of pipe 224 of said at least one pumping device 220.

Figure 7:
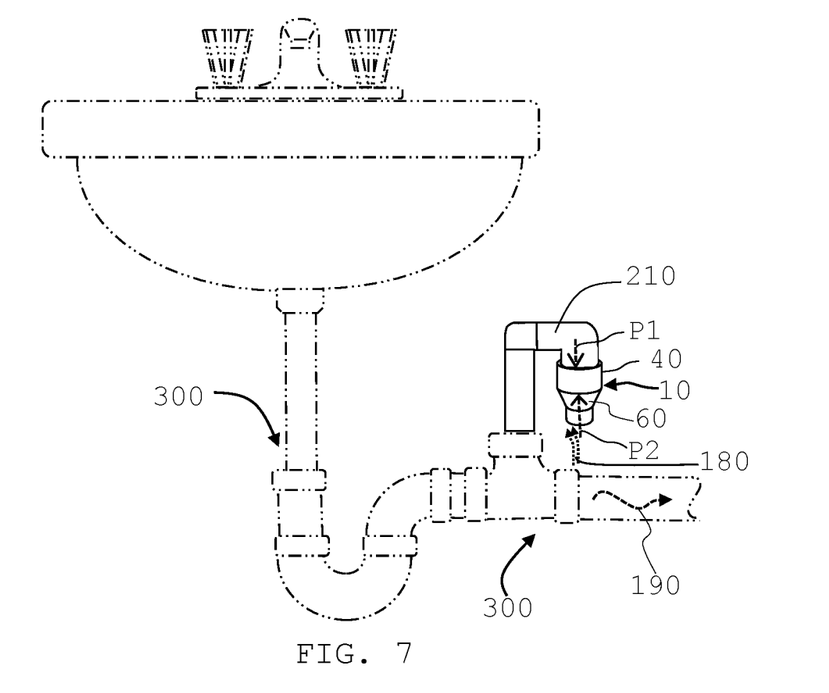
FIG. 7 is a schematic view of one of the embodiments of the invention installed in a piping system.

Referring to FIG. 7 and FIG. 1C, in one embodiment of the apparatus 10, said apparatus 10 is installed to an piping system 300, wherein piping system 300 wherein said piping system 300 further comprises at least one conduit 210, wherein each said at least one conduit 210 connected to said upper flow passage 40 of said apparatus 10, wherein said upper flow passage 40 has an upper flow passage P1 adopted to said ambient pressure of said piping system 300, wherein a draining flow 190 is drained from said piping system 300 causing a negative pressure situation, which causes said upper flow passage pressure P1 in the enclosed environment 200 to drop below said lower flow passage pressure P2 in said lower flow passage 60 and the weight of the rotary valve 80 (FIG. 1C); therefore, a lifting force to lift the rotary valve 80 (FIG. 3) off the gasket 100 (FIG. 3) to allow a flow 180, such as air, entering lower flow passage 60 to upper flow passage 40 and then to the piping system 300 to release the negative pressure condition.

Figure 8:
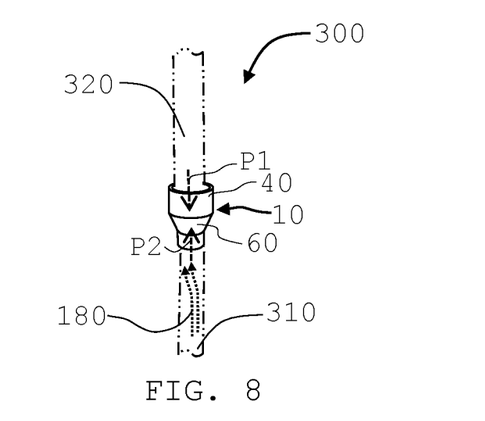
FIG. 8 is a schematic view of one of the embodiments of the invention installed in another piping system.

Referring to FIG. 8, FIG. 1B, and FIG. 1C, one embodiment of the apparatus 10 wherein said apparatus 10 is installed in a piping system 300, wherein said piping system has a flow 180 moves between a lower elevation position 310 of said piping system 300 to a upper elevation position 320 of said piping system 300, wherein said upper flow passage 40 of said apparatus 10 is communicated with said upper flow passage 40 communicated with said upper elevation position 320 of said piping system 300, wherein said lower flow passage 60 is communicated with said lower elevation position 310 of said piping system 300, wherein said rotary valve 80 (FIG. 1C) is in an open position 102 (FIG. 1C), wherein said flow 180 moves from said lower elevation position 310 of said piping system 300 toward said upper elevation position 320 of said piping system 300, and wherein said rotary valve 80 (FIG. 1B) is in said closed position 104 (FIG. 1B) wherein said flow 180 moves from said upper elevation position 320 of said piping system 300 toward said lower elevation position 310 of said piping system 300.

What is claimed is:

1. An apparatus to allow or stop a flow into a piping system or an enclosed environment, comprising:
   (a) a housing having an upper flow passage, a gasket, and a lower flow passage, wherein said gasket is between said upper flow passage and said lower flow passage, and wherein said gasket has an inner diameter smaller than an inner diameter of said upper flow passage;
   (b) a rotary valve inside said housing, wherein said rotary valve further comprises a main body and two guides affixed to said main body in opposition to each other, wherein said rotary valve has a predetermined weight, wherein said main body of said rotary valve is dimensioned to be between said inner diameter of said gasket and said inner diameter of said upper flow passage, wherein said rotary valve can rotate axially relative to said guides when said flow from said lower flow passage flows through the housing, and wherein said lower rotary valve can move inside said upper flow passage and above said gasket; and
   (c) two guide rails inside the upper flow passage for guiding the rotary valve between an open position and a closed position, wherein said each of two guides of said rotary valve are disposed in each of said two guide rails, and wherein said two guides move freely up and down in said two guide rails.

2. The apparatus of claim 1, wherein an upper flow passage pressure exists in said upper flow passage, wherein a lower flow passage pressure exists in said lower flow passage, wherein said rotary valve is in said closed position when said rotary valve rests on said gasket to seal said gasket, wherein said rotary valve is in said open position when said rotary valve moves away from said gasket to unseal said gasket, wherein said rotary valve is in said open position when said lower flow passage pressure is greater than said predetermined weight of said rotary valve and said upper flow passage pressure, wherein said rotary valve is in said closed position when said lower flow passage pressure is less than or equal to said predetermined weight of said rotary valve and said upper flow passage pressure, wherein said flow cannot pass through said gasket when said rotary valve is in said closed position, and wherein said flow can pass through said gasket when rotary valve is in said open position.

3. The apparatus of claim 1, further comprising a turbulator on each of said two guides, wherein said turbulator comprises a plurality of impellers radially affixed to each of said guides, and wherein said turbulator rotates said rotary valve axially relative to said guides when said flow from said lower flow passage pushes said plurality of impellers.

4. The apparatus of claim 1, further comprising an upper flow passage filter located in said upper flow passage and a lower flow passage filter located in said lower flow passage, wherein said upper flow passage filter and said lower flow passage filter have a predetermined sieve size to prevent a plurality of foreign objects from entering said housing.

5. The apparatus of claim 1, wherein said apparatus is configured to be inside said enclosed environment, wherein said enclosed environment has an ambient pressure in said enclosed environment, wherein said enclosed environment further comprises at least one conduit, wherein each said at least one conduit has a first end and a second end, wherein each of said at least one conduit has said first end connected to said lower flow passage of said apparatus and said second end extends out of said enclosed environment, wherein said upper flow passage pressure is adopted to said ambient pressure of said enclosed environment, wherein said rotary valve is in said open position when said lower flow passage pressure is greater than said predetermined weight of said rotary valve and said upper flow passage pressure, and wherein said rotary valve is in said closed position when said lower flow passage pressure is equal to or less than said predetermined weight of said rotary valve and said upper flow passage pressure.

6. The apparatus of claim 1, wherein said apparatus is configured to be outside said enclosed environment, wherein said enclosed environment has an ambient pressure in said enclosed environment, wherein said enclosed environment further comprises at least one conduit, wherein each said at least one conduit has a first end and a second end, wherein each of said at least one conduit has said first end connected to said upper flow passage of said apparatus and said second end connected to and communicated with said enclosed environment, wherein said upper flow passage pressure is adopted to said ambient pressure of said enclosed environment, wherein said rotary valve is in said open position when said lower flow passage pressure is greater than said predetermined weight of said rotary valve and said upper flow passage pressure, and wherein said rotary valve is in said closed position when said lower flow passage pressure is equal to or less than said predetermined weight of said rotary valve and said upper flow passage pressure.

7. The apparatus of claim 1, wherein said apparatus is installed in a piping system, wherein said piping system has a pipe flow moves between a lower elevation position of said piping system to a upper elevation position of said piping system, wherein said upper flow passage of said apparatus is communicated with said upper elevation position of said piping system, wherein said lower flow passage is communicated with said lower elevation position of said piping system, wherein said rotary valve is in an open position, wherein said pipe flow moves from said lower elevation position of said piping system toward said upper elevation position of said piping system, and wherein said rotary valve is in said closed position wherein said pipe flow moves from said upper elevation position of said piping system toward said lower elevation of said piping system.

8. The apparatus of claim 1, wherein said main body of said rotary valve is made of a flexible material having a Shore Hardness about 60 A to about 90 A.

9. The apparatus of claim 1, wherein said main body of said rotary valve has a hard inner core and a flexible material outer core around said hard inner core.

10. The apparatus of claim 1, wherein said main body of said rotary valve has a flexible material outer core and is hollow inside said main body.

11. An apparatus to allow or stop a flow into a piping system or an enclosed environment, comprising:
   (a) a housing having an upper flow passage, a gasket, and a lower flow passage, wherein said gasket is between said upper flow passage and said lower flow passage, and wherein said gasket has an inner diameter smaller than an inner diameter of said upper flow passage;
   (b) a rotary valve inside said housing, wherein said rotary valve further comprises a main body and two guides affixed to said main body in opposition to each other, wherein said rotary valve has a predetermined weight, wherein said main body of said rotary valve is dimensioned to be between said inner diameter of said gasket and said inner diameter of said upper flow passage, and wherein said rotary valve can move inside said upper flow passage and above said gasket;
   (c) two guide rails inside the upper flow passage for guiding the rotary valve between an open position and a closed position, wherein said each of two guides of said rotary valve are disposed in each of said two guide rails, and wherein said two guides move freely up and down in said two guide rails;
   (d) an upper flow passage filter; and
   (e) a lower flow passage filter, wherein said upper flow passage filter and said lower flow passage filter have a predetermined sieve size to prevent a plurality of foreign objects from entering said housing, wherein an upper flow passage pressure exists in said upper flow passage, wherein a lower flow passage pressure exists in said lower flow passage, wherein said rotary valve is in said closed position when said rotary valve rests on said gasket to seal said gasket, wherein said rotary valve is in said open position when said rotary valve moves away from said gasket to unseal said gasket, wherein said rotary valve is in said open position when said lower flow passage pressure is greater than said predetermined weight of said rotary valve and said upper flow passage pressure, wherein said rotary valve is in said closed position when said lower flow passage pressure is less than or equal to said predetermined weight of said rotary valve and said upper flow passage pressure, wherein said flow cannot pass through said gasket when said rotary valve is in said closed position, and wherein said flow can pass through said gasket when rotary valve is in said open position.

12. The apparatus of claim 11, wherein said apparatus is configured to be inside said enclosed environment, wherein said enclosed environment has an ambient pressure in said enclosed environment, wherein said enclosed environment further comprises at least one conduit, wherein each said at least one conduit has a first end and a second end, wherein each of said at least one conduit has said first end connected to said lower flow passage of said apparatus and said second end extends out of said enclosed environment, wherein said upper flow passage pressure is adopted to said ambient pressure of said enclosed environment, wherein said rotary valve is in said open position when said lower flow passage pressure is greater than said predetermined weight of said rotary valve and said upper flow passage pressure, and wherein said rotary valve is in said closed position when said lower flow passage pressure is equal to or less than said predetermined weight of said rotary valve and said upper flow passage pressure.

13. The apparatus of claim 11, wherein said apparatus is configured to be outside said enclosed environment, wherein said enclosed environment has an ambient pressure in said enclosed environment, wherein said enclosed environment further comprises at least one conduit, wherein each said at least one conduit has a first end and a second end, wherein each of said at least one conduit has said first end connected to said upper flow passage of said apparatus and said second end connected to and communicated with said enclosed environment, wherein said upper flow passage pressure is adopted to said ambient pressure of said enclosed environment, wherein said rotary valve is in said open position when said lower flow passage pressure is greater than said predetermined weight of said rotary valve and said upper flow passage pressure, and wherein said rotary valve is in said closed position when said lower flow passage pressure is equal to or less than said predetermined weight of said rotary valve and said upper flow passage pressure.

14. The apparatus of claim 11, wherein said apparatus is installed in a piping system, wherein said piping system has a pipe flow moves between a lower elevation position of said piping system to a upper elevation position of said piping system, wherein said upper flow passage of said apparatus is communicated with said upper elevation position of said piping system, wherein said lower flow passage is communicated with said lower elevation position of said piping system, wherein said rotary valve is in said open position, wherein said pipe flow moves from said lower elevation position of said piping system toward said upper elevation position of said piping system, and wherein said rotary valve is in said closed position wherein said pipe flow moves from said upper elevation position of said piping system toward said lower elevation of said piping system.

15. An apparatus to allow or stop a flow into a piping system or an enclosed environment, comprising:

(a) a housing having an upper flow passage, a gasket, and a lower flow passage, wherein said gasket is between said upper flow passage and said lower flow passage, and wherein said gasket has an inner diameter smaller than an inner diameter of said upper flow passage;
(b) a rotary valve inside said housing, wherein said rotary valve further comprises a main body and two guides affixed to said main body in opposition to each other, wherein said rotary valve has a predetermined weight, wherein said main body of said rotary valve is dimensioned to be between said inner diameter of said gasket and said inner diameter of said upper flow passage, and wherein said rotary valve can move inside said upper flow passage and above said gasket;
(c) two guide rails inside the upper flow passage for guiding the rotary valve between an open position and a closed position, wherein said each of two guides of said rotary valve are disposed in each of said two guide rails, and wherein said two guides move freely up and down in said two guide rails;
(d) an upper flow passage filter; and
(e) a lower flow passage filter, wherein said upper flow passage filter and said lower flow passage filter have a predetermined sieve size to prevent a plurality of foreign objects from entering said housing;
(f) a turbulator on each of said two guides, wherein said turbulator comprises a plurality of impellers radially affixed to each of said guides, and wherein said turbulator rotates said rotary valve axially relative to said guides when said flow from said lower flow passage pushes said plurality of impellers; wherein an upper flow passage pressure exists in said upper flow passage, wherein a lower flow passage pressure exists in said lower flow passage, wherein said rotary valve is in a closed position when said rotary valve rests on said gasket to seal said gasket, wherein said rotary valve is in said open position when said rotary valve moves away from said gasket to unseal said gasket, wherein said rotary valve is in said open position when said lower flow passage pressure is greater than said predetermined weight of said rotary valve and said upper flow passage pressure, wherein said rotary valve is in said closed position when said lower flow passage pressure is less than or equal to said predetermined weight of said rotary valve and said upper flow passage pressure, wherein said flow cannot pass through said gasket when said rotary valve is in said closed position, and wherein said flow can pass through said gasket when rotary valve is in said open position.

16. The apparatus of claim 15, wherein said apparatus is configured to be inside said enclosed environment, wherein said enclosed environment has an ambient pressure in said enclosed environment, wherein said enclosed environment further comprises at least one conduit, wherein each said at least one conduit has a first end and a second end, wherein each of said at least one conduit has said first end connected to said lower flow passage of said apparatus and said second end extends out of said enclosed environment, wherein said upper flow passage pressure is adopted to said ambient pressure of said enclosed environment, wherein said rotary valve is in said open position when said lower flow passage pressure is greater than said predetermined weight of said rotary valve and said upper flow passage pressure, and wherein said rotary valve is in said closed position when said lower flow passage pressure is equal to or less than said predetermined weight of said rotary valve and said upper flow passage pressure.

17. The apparatus of claim 15, wherein said apparatus is configured to be outside said enclosed environment, wherein said enclosed environment has an ambient pressure in said enclosed environment, wherein said enclosed environment further comprises at least one conduit, wherein each said at least one conduit has a first end and a second end, wherein each of said at least one conduit has said first end connected to said upper flow passage of said apparatus and said second end connected to and communicated with said enclosed environment, wherein said upper flow passage pressure is adopted to said ambient pressure of said enclosed environment, wherein said rotary valve is in said open position when said lower flow passage pressure is greater than said predetermined weight of said rotary valve and said upper flow passage pressure, and wherein said rotary valve is in said closed position when said lower flow passage pressure is equal to or less than said predetermined weight of said rotary valve and said upper flow passage pressure.

18. The apparatus of claim 15, wherein said apparatus is installed in a piping system, wherein said piping system has a pipe flow moves between a lower elevation position of said piping system to a upper elevation position of said piping system, wherein said upper flow passage of said apparatus is communicated with said upper elevation position of said piping system, wherein said lower flow passage is communicated with said lower elevation position of said piping system, wherein said rotary valve is in said open position, wherein said pipe flow moves from said lower elevation position of said piping system toward said upper elevation position of said piping system, and wherein said rotary valve is in said closed position wherein said pipe flow moves from said upper elevation position of said piping system toward said lower elevation of said piping system.

* * * * *